(12) United States Patent
Tuxen et al.

(10) Patent No.: US 10,052,542 B2
(45) Date of Patent: Aug. 21, 2018

(54) SYSTEMS AND METHODS FOR COORDINATING RADAR DATA AND IMAGE DATA TO TRACK A FLIGHT OF A PROJECTILE

(71) Applicant: TRACKMAN A/S, Vedbaek (DK)

(72) Inventors: Fredrik Tuxen, Hørsholm (DK); Frederik Ettrup Brink, Søborg (DK)

(73) Assignee: TRACKMAN A/S, Vedback (DK)

( * ) Notice: Subject to any disclaimer, the term of this patent is extended or adjusted under 35 U.S.C. 154(b) by 5 days.

(21) Appl. No.: 15/050,456

(22) Filed: Feb. 22, 2016

(65) Prior Publication Data

US 2016/0247292 A1 Aug. 25, 2016

Related U.S. Application Data

(63) Continuation of application No. 13/138,167, filed as application No. PCT/EP2010/051102 on Aug. 9, (Continued)

(51) Int. Cl.
*G06K 9/00* (2006.01)
*A63B 69/36* (2006.01)
(Continued)

(52) U.S. Cl.
CPC .......... *A63B 69/36* (2013.01); *A63B 24/0003* (2013.01); *A63B 24/0021* (2013.01);
(Continued)

(58) Field of Classification Search
None
See application file for complete search history.

(56) References Cited

U.S. PATENT DOCUMENTS

| 3,025,520 A | 3/1962 | Werner et al. |
| 3,264,643 A | 8/1966 | Nilssen |

(Continued)

FOREIGN PATENT DOCUMENTS

| DE | 26 20 991 A1 | 3/1977 |
| DE | 102005046085 | 3/2007 |

(Continued)

OTHER PUBLICATIONS

Jul. 14, 2014 Notice of Allowance issued in corresponding U.S. Appl. No. 13/303,869.

(Continued)

*Primary Examiner* — Atiba O Fitzpatrick
(74) *Attorney, Agent, or Firm* — Fay Kaplun & Marcin, LLP

(57) ABSTRACT

A system for coordinating radar data and image data to track a flight of a projectile includes a radar, an imager, and a controller. The imager provides an image of an area into which a projectile is to be launched. The controller receives the image and an identification of a target within the image and identifies a target line connecting the target and a launch position of the projectile. The controller also receives data from the radar relative to at least a portion of a trajectory of the projectile, generates image based trajectory data by correlating the radar data and the image, and alters the image to include the image based trajectory data within the image and the target line within the image.

22 Claims, 2 Drawing Sheets

Related U.S. Application Data 2011, now abandoned, and a continuation-in-part of application No. 11/630,904, filed as application No. PCT/DK2005/000456 on Jul. 20, 2009, now Pat. No. 8,085,188.

(60) Provisional application No. 61/202,111, filed on Jan. 29, 2009, provisional application No. 60/584,483, filed on Jul. 2, 2004.

(51) Int. Cl.

| | | |
|---|---|---|
| A63B 24/00 | (2006.01) | |
| A63B 71/06 | (2006.01) | |
| G06K 9/52 | (2006.01) | |
| G06K 9/62 | (2006.01) | |
| G06T 7/60 | (2017.01) | |
| H04N 5/225 | (2006.01) | |
| G06T 3/00 | (2006.01) | |
| G06T 7/32 | (2017.01) | |
| G06T 7/73 | (2017.01) | |
| G06T 7/246 | (2017.01) | |
| A63B 102/32 | (2015.01) | |
| A63B 102/20 | (2015.01) | |
| A63B 102/16 | (2015.01) | |
| A63B 102/02 | (2015.01) | |
| A63B 102/18 | (2015.01) | |
| G06K 9/46 | (2006.01) | |

(52) U.S. Cl.
CPC .......... *A63B 69/3658* (2013.01); *A63B 71/06* (2013.01); *A63B 71/0605* (2013.01); *A63B 71/0619* (2013.01); *G06K 9/52* (2013.01); *G06K 9/6201* (2013.01); *G06T 3/0006* (2013.01); *G06T 7/246* (2017.01); *G06T 7/248* (2017.01); *G06T 7/32* (2017.01); *G06T 7/60* (2013.01); *G06T 7/73* (2017.01); *G06T 7/74* (2017.01); *H04N 5/225* (2013.01); *A63B 2024/0031* (2013.01); *A63B 2024/0034* (2013.01); *A63B 2071/065* (2013.01); *A63B 2071/0636* (2013.01); *A63B 2102/02* (2015.10); *A63B 2102/16* (2015.10); *A63B 2102/18* (2015.10); *A63B 2102/20* (2015.10); *A63B 2102/32* (2015.10); *A63B 2220/05* (2013.01); *A63B 2220/12* (2013.01); *A63B 2220/20* (2013.01); *A63B 2220/30* (2013.01); *A63B 2220/35* (2013.01); *A63B 2220/806* (2013.01); *A63B 2220/807* (2013.01); *A63B 2220/89* (2013.01); *A63B 2243/0025* (2013.01); *A63B 2243/0033* (2013.01); *A63B 2243/0037* (2013.01); *A63B 2243/0095* (2013.01); *G06K 2009/4666* (2013.01); *G06T 2207/10044* (2013.01); *G06T 2207/30221* (2013.01); *G06T 2207/30224* (2013.01); *G06T 2207/30241* (2013.01)

(56) References Cited

U.S. PATENT DOCUMENTS

| | | |
|---|---|---|
| 3,324,468 A | 6/1967 | Knepper |
| 3,540,054 A | 11/1970 | Broderick |
| 3,777,665 A | 12/1973 | Ziemba |
| 3,798,644 A | 3/1974 | Constant |
| 3,798,795 A | 3/1974 | Michelsen |
| 3,856,237 A | 12/1974 | Torian et al. |
| 3,974,740 A | 8/1976 | Billottet et al. |
| 3,981,010 A | 9/1976 | Michelsen |
| 3,992,708 A | 11/1976 | Olson et al. |
| 4,015,258 A | 3/1977 | Smith et al. |
| 4,050,068 A | 9/1977 | Berg et al. |
| 4,264,907 A | 4/1981 | Durand, Jr. et al. |
| 4,477,814 A | 10/1984 | Brumbaugh et al. |
| 4,509,052 A | 4/1985 | Cash |
| 4,545,576 A | 10/1985 | Harris |
| 4,563,005 A | 1/1986 | Hand et al. |
| 4,622,554 A | 11/1986 | Gellekink et al. |
| 4,639,733 A | 1/1987 | King et al. |
| 4,713,686 A | 12/1987 | Ozaki et al. |
| 4,717,916 A | 1/1988 | Adams et al. |
| 4,751,511 A | 6/1988 | Komata et al. |
| 4,780,719 A | 10/1988 | Frei et al. |
| 5,018,218 A | 5/1991 | Peregrim et al. |
| 5,056,791 A | 10/1991 | Poillon et al. |
| 5,092,602 A | 3/1992 | Witler et al. |
| 5,134,409 A | 7/1992 | Groot |
| 5,138,322 A | 8/1992 | Nuttall |
| 5,150,895 A | 9/1992 | Berger |
| 5,241,317 A | 8/1993 | Howard |
| 5,246,232 A | 9/1993 | Eccher et al. |
| 5,290,037 A | 3/1994 | Witler et al. |
| 5,319,373 A | 6/1994 | Maxwell et al. |
| 5,341,142 A | 8/1994 | Reis et al. |
| 5,342,051 A | 8/1994 | Rankin et al. |
| 5,357,255 A | 10/1994 | Giraudy |
| 5,375,832 A | 12/1994 | Witler et al. |
| 5,401,026 A | 3/1995 | Eccher et al. |
| 5,404,144 A | 4/1995 | Vlannes |
| 5,406,290 A | 4/1995 | James et al. |
| 5,413,345 A | 5/1995 | Nauck |
| 5,486,002 A | 1/1996 | Witler et al. |
| 5,489,099 A | 2/1996 | Rankin et al. |
| 5,495,249 A | 2/1996 | Chazelle et al. |
| 5,609,534 A | 3/1997 | Gebhardt et al. |
| 5,631,654 A | 5/1997 | Karr |
| 5,652,588 A | 7/1997 | Miron |
| 5,657,027 A | 8/1997 | Guymon |
| 5,700,204 A | 12/1997 | Teder |
| 5,781,505 A | 7/1998 | Rowland |
| 5,796,474 A | 8/1998 | Squire et al. |
| 5,803,823 A | 9/1998 | Gobush et al. |
| 5,846,139 A | 12/1998 | Bair et al. |
| 5,868,578 A | 2/1999 | Baum |
| 5,873,040 A | 2/1999 | Dunn et al. |
| 5,879,246 A | 3/1999 | Gebhardt et al. |
| 5,912,700 A | 6/1999 | Honey et al. |
| 5,952,957 A | 9/1999 | Szu |
| 6,042,492 A | 3/2000 | Baum |
| 6,057,915 A | 5/2000 | Squire et al. |
| 6,067,039 A | 5/2000 | Pyner et al. |
| 6,133,946 A | 10/2000 | Cavallaro et al. |
| 6,179,720 B1 | 1/2001 | Rankin et al. |
| 6,198,501 B1 | 3/2001 | Nemiroff et al. |
| 6,239,747 B1 | 5/2001 | Kaminski |
| 6,244,971 B1 | 6/2001 | Mihran |
| 6,252,632 B1 | 6/2001 | Cavallaro |
| 6,266,005 B1 | 7/2001 | Schneider |
| 6,292,130 B1 | 9/2001 | Cavallaro et al. |
| 6,304,665 B1 | 10/2001 | Cavallaro et al. |
| 6,320,173 B1 | 11/2001 | Vock et al. |
| 6,371,862 B1 | 4/2002 | Reda |
| 6,400,306 B1 | 6/2002 | Nohara et al. |
| 6,421,116 B1 | 7/2002 | Schilli et al. |
| 6,450,442 B1 | 9/2002 | Schneider et al. |
| 6,456,232 B1 | 9/2002 | Milnes et al. |
| 6,520,864 B1 | 2/2003 | Wilk |
| 6,547,671 B1 | 4/2003 | Mihran |
| 6,592,465 B2 | 7/2003 | Lutz et al. |
| 6,621,561 B2 | 9/2003 | Holton |
| 6,764,412 B2 | 7/2004 | Gobush et al. |
| 6,778,148 B1 | 8/2004 | Pack et al. |
| 6,791,217 B2 | 9/2004 | Collier-Hallman et al. |
| 6,816,185 B2 | 11/2004 | Harmath |
| 6,903,676 B1 | 6/2005 | Frady |
| 6,956,523 B2 | 10/2005 | Mohan |
| 6,989,789 B2 | 1/2006 | Ferreol et al. |
| 7,026,990 B2 | 4/2006 | Cooper et al. |
| 7,031,873 B2 | 4/2006 | Song |
| 7,132,975 B2 | 11/2006 | Fullerton et al. |

(56) References Cited

U.S. PATENT DOCUMENTS

| | | | |
|---|---|---|---|
| 7,133,801 B2 | 11/2006 | Song | |
| 7,161,733 B2 | 1/2007 | Fukata et al. | |
| 7,183,966 B1 | 2/2007 | Schramek et al. | |
| 7,213,442 B2 | 5/2007 | Workman | |
| 7,321,330 B2 | 1/2008 | Sajima | |
| 8,054,216 B2 | 11/2011 | Kinoshita et al. | |
| 8,077,917 B2 | 12/2011 | Forsgren | |
| 8,085,188 B2 | 12/2011 | Tuxen | |
| 8,189,857 B2 | 5/2012 | Johnson et al. | |
| 8,461,965 B2 | 6/2013 | Chen et al. | |
| 8,665,153 B2 | 3/2014 | Nakagawa et al. | |
| 8,845,442 B2 | 9/2014 | Tuxen | |
| 8,866,665 B2 | 10/2014 | Suzuki | |
| 8,912,945 B2 | 12/2014 | Tuxen | |
| 9,036,864 B2 | 5/2015 | Johnson et al. | |
| 9,645,235 B2 | 5/2017 | Tuxen | |
| 2002/0075475 A1 | 6/2002 | Holton | |
| 2002/0107078 A1 | 8/2002 | Collins | |
| 2002/0114493 A1 | 8/2002 | McNitt et al. | |
| 2003/0027655 A1 | 2/2003 | Lutz et al. | |
| 2003/0076255 A1 | 4/2003 | Ono | |
| 2003/0103684 A1 | 6/2003 | Gobush et al. | |
| 2004/0032363 A1 | 2/2004 | Schantz et al. | |
| 2004/0032970 A1 | 2/2004 | Kiraly | |
| 2004/0156035 A1 | 8/2004 | Rogers | |
| 2004/0248662 A1 | 12/2004 | Gobush et al. | |
| 2005/0030222 A1 | 2/2005 | Steudel | |
| 2005/0030333 A1 | 2/2005 | Takahashi et al. | |
| 2006/0092075 A1 | 5/2006 | Bruce et al. | |
| 2006/0169932 A1 | 8/2006 | Fukata et al. | |
| 2007/0167247 A1 | 7/2007 | Lindsay | |
| 2007/0293331 A1 | 12/2007 | Tuxen | |
| 2008/0021651 A1 | 1/2008 | Seeley et al. | |
| 2008/0048907 A1 | 2/2008 | Matsuura et al. | |
| 2008/0068463 A1* | 3/2008 | Claveau | H04N 5/262 348/157 |
| 2008/0139330 A1 | 10/2008 | Tuxen | |
| 2008/0261711 A1 | 10/2008 | Tuxen | |
| 2009/0295624 A1 | 12/2009 | Tuxen | |
| 2011/0250939 A1 | 10/2011 | Hobler | |
| 2011/0286632 A1 | 11/2011 | Tuxen | |
| 2011/0304497 A1 | 12/2011 | Molyneux et al. | |
| 2013/0271323 A1 | 10/2013 | Joo et al. | |
| 2013/0274025 A1 | 10/2013 | Luciano, Jr. et al. | |
| 2013/0346009 A1 | 12/2013 | Winter et al. | |
| 2014/0191896 A1 | 7/2014 | Johnson et al. | |
| 2014/0347212 A1 | 11/2014 | Tuxen | |
| 2015/0234045 A1 | 8/2015 | Rosenblum et al. | |
| 2016/0170015 A1 | 6/2016 | Tuxen | |
| 2016/0243423 A1 | 8/2016 | Tuxen et al. | |
| 2016/0247292 A1 | 8/2016 | Tuxen et al. | |
| 2016/0306035 A1 | 10/2016 | Johnson | |
| 2016/0306036 A1 | 10/2016 | Johnson | |
| 2016/0306037 A1 | 10/2016 | Johnson | |
| 2016/0313441 A1 | 10/2016 | Tuxen | |
| 2016/0320476 A1 | 11/2016 | Johnson | |
| 2016/0339320 A1 | 11/2016 | Johnson et al. | |

FOREIGN PATENT DOCUMENTS

| | | | |
|---|---|---|---|
| EP | 0 116 183 A1 | 8/1984 | |
| EP | 0 529 489 A1 | 3/1993 | |
| EP | 1 158 270 A1 | 11/2001 | |
| GB | 2283144 A | 4/1995 | |
| GB | 2 294 403 A | 5/1996 | |
| GB | 2319834 A | 6/1998 | |
| GB | 2 380 682 A | 4/2003 | |
| JP | 59-137873 A | 8/1984 | |
| JP | S59137873 | 8/1984 | |
| JP | H06-126015 A | 5/1994 | |
| JP | H06213989 | 8/1994 | |
| JP | H08-266701 A | 10/1996 | |
| JP | 2000230974 | 8/2000 | |
| JP | 2001-074837 A | 3/2001 | |
| JP | 2001-305528 A | 10/2001 | |
| JP | 2003-098255 A | 4/2003 | |
| JP | 2003-294777 A | 10/2003 | |
| JP | 2007163321 | 6/2007 | |
| JP | 2008249354 | 10/2008 | |
| JP | 2010125790 | 11/2010 | |
| JP | 2011092813 | 8/2011 | |
| WO | 90/08936 A1 | 8/1990 | |
| WO | 91/06348 A1 | 5/1991 | |
| WO | 93/04382 A1 | 3/1993 | |
| WO | 99/27384 A1 | 6/1999 | |
| WO | 00/62090 A1 | 10/2000 | |
| WO | 02/25303 A2 | 3/2002 | |
| WO | 2003/005281 A1 | 1/2003 | |
| WO | 03/032006 A1 | 4/2003 | |
| WO | 2004/031680 A1 | 4/2004 | |
| WO | 2005/017553 A1 | 2/2005 | |
| WO | 2005/081014 A1 | 9/2005 | |
| WO | 2005/116678 A2 | 12/2005 | |
| WO | 2006/002639 A1 | 1/2006 | |
| WO | 2006/002640 A1 | 1/2006 | |
| WO | WO 2006/002639 | * 1/2006 | A63B 69/36 |
| WO | 2008/038005 | 4/2008 | |
| WO | 2010/086414 | 8/2010 | |
| WO | 2016/110757 | 7/2016 | |

OTHER PUBLICATIONS

Jul. 18, 2014 Notice of Allowance issued in corresponding U.S. Appl. No. 11/865,280.

Jan. 3, 2012 Office Action issued in U.S. Appl. No. 11/885,280.

Jul. 25, 2011 Office Action issued in U.S. Appl. No. 11/885,280.

Oct. 8, 2013 Office Action issued in U.S. Appl. No. 13/303,889.

Lolck, Jens-Erik. "TERMA Elektronik AS: Doppler Radar Spin Measurement," Brochure (1986).

DR 5000 User's Guide: DR 5000 Spin Calculation, pp. 27-45 and 48-59 (2004).

Zhang Ruoyo et al., "Radar Reflected Signal Process of High Spinning Rate Projectiles," The Eighth International Conference on Electronic Measurement and Instruments, pp. 3-982-3-985, 2007.

Ye Wei et al., "A New Method for Spin Estimation Using the Data of Doppler Radar," Proceedings of ICSP, pp. 1911-1914, 2000.

Katsuhiko Masuda et al., "Measurement of Initial Conditions of a Flying Golf Ball," WEAM 4-4, pp. 344-347, 1994.

John K. Christensen et al., "Doppler-Surface Mapping Technique for Characterization of Spinning Cylinders Illuminated by Radar," A & E Systems Magazine, pp. 19-24, Aug. 2005.

Soon-Huat Ong et al., "Signal-Adapted Wavelets for Doppler Radar System," Seventh Annual Conference on Control, pp. 19-23, Dec. 2002.

Technology. Zelocity, Golf Performance Monitors.—http://www.zelocity.com/golf/technology.shtml. Copyright 2004-2006. Retrieved Jun. 9, 2010.

3D Doppler Ball Traking Monitors, Golf Radars and Launch Monitors. Flightscope—http://www.fligtscope.com/index.php/About-Us/about-us.html. Copyright 2009. Retrieved Jun. 9, 2010.

Bosse et al., "Improved radar tracking using a multipath model: maximum likelihood compared with eigenvector analysis," IEEE Proc. Radar, Sonar Navig., vol. 141, No. 4, pp. 213-222 (Aug. 1994).

Sep. 14, 2005 International Search Report issued in International Application No. PCT/DK2004/000918.

Aug. 17, 2006 International Search Report issued in International Application No. PCT/DK2006/000117.

Nov. 7, 2005 International Search Report issued in International Application No. PCT/DK2005/000456.

Nov. 25, 2005 International Search Report issued in International Application No. PCT/DK2005/000457.

Feb. 15, 2006 International Search Report issued in International Application PCT/DK2005/000336.

Aug. 17, 2006 International Search Report issued in International Application PCT/DK2006/000117.

Apr. 24, 2012 Office Action issued in U.S. Appl. No. 13/303,889.

(56) References Cited

OTHER PUBLICATIONS

"Trackman System Used to Track Tiger Wood's ball at US Open", Jul. 16, 2008 (Jul. 16, 2008), Retrieved from the Internet: URL: http://www.youtube.com/watch?v=0esAOPRZaVg [retrieved on Mar. 29, 2011].
Nov. 23, 2015 Notice of Allowance issued in U.S. Appl. No. 13/138,167.
Apr. 22, 2015 Office Action issued in U.S. Appl. No. 13/138,167.
Mar. 31, 2014 Office Action issued in U.S. Appl. No. 13/138,167.
Oct. 16, 2013 Office Action issued in U.S. Appl. No. 13/138,167.
Blackaby, "Simultaneous RF/EO tracking and characterization of dismounts", MSc Thesis, 2008, 52 Sheets.
Fasano et al., "Radar/electro-optical data fusion for non-cooperative UAS sense and avoid", Aerospace Science and Technology, 2015, vol. 46, pp. 436-450.
Warthman; Technical Note D-1138: Project Echo—Boresight Cameras for recording antenna point accuracy; NASA, Sep. 1961, 14 sheets.

* cited by examiner

SYSTEMS AND METHODS FOR COORDINATING RADAR DATA AND IMAGE DATA TO TRACK A FLIGHT OF A PROJECTILE

CROSS-REFERENCE TO RELATED APPLICATIONS

The present application is a Continuation application of U.S. patent application Ser. No. 13/138,167 filed Aug. 9, 2011; which is a 371 application of PCT Application Serial No. PCT/EP2010/051102 filed Jan. 29, 2010; which claims priority benefit to U.S. Provisional Patent Application Ser. No. 61/202,111 filed Jan. 29, 2009. In addition, PCT Application Serial No. PCT/EP2010/051102 is a Continuation-in-Part application of U.S. patent application Ser. No. 11/630,904 filed Jul. 20, 2009, now U.S. Pat. No. 8,085,188; which is a 371 application of PCT Application Serial No. PCT/DK2005/00456 filed Jul. 1, 2005; which claims priority benefit to U.S. Provisional Patent Application Ser. No. 60/584,483 filed Jul. 2, 2004. Specifications of the above applications/patents are expressly incorporated herein, in their entirety, by reference.

SUMMARY

The present disclosure relates to a system comprising a camera and a radar, for example, for combining imaging and motion determination of athletes' movements and/or for coordinating radar data and image data to track a flight of a projectile.

According to aspects of the disclosure, a system for coordinating radar data and image data to track a flight of a projectile includes a radar, an imager, and a controller. The imager provides an image of an area into which a projectile is to be launched. The controller receives the image and an identification of a target within the image and identifies a target line connecting the target and a launch position of the projectile. The controller also receives data from the radar relative to at least a portion of a trajectory of the projectile, generates image based trajectory data by correlating the radar data and the image, and alters the image to include the image based trajectory data within the image and the target line within the image.

In accordance with aspects of the disclosure, a device for coordinating radar data and image data to track the flight of a projectile comprises a controller receiving an image and an identification of a target within the image and identifying a target line connecting the target and a launch position of the projectile. The controller also receives data from a radar relative to at least a portion of a trajectory of the projectile, generates image based trajectory data by correlating the radar data and the image, and alters the image to include the image based trajectory data within the image and the target line within the image.

According to aspects of the disclosure, a method for coordinating radar data and image data to track a flight of a projectile comprises receiving, by a controller, an image and an identification of a target within the image as well as radar data relating to at least a portion of a trajectory of a projectile traveling through a field of view represented by the image; identifying, by the controller, a target line connecting the target and a launch position of the projectile; generating, by the controller, image based trajectory data by correlating the radar data and the image; and altering the image to include the image based trajectory data and the target line within the image.

In one exemplary aspect, the invention relates to an assembly including a radar and an imaging device. The assembly further includes a controller adapted to: receive radar data from the radar and an image from the imaging device; determine, from the radar data, data of objects imaged by the imaging device, the data being associated with one of positions, directions, trajectories, or planes of movement of the objects; and identify, from the data, a position of impact of a first object of the objects and a second object of the objects at a correct position in the image by providing movement data. The movement data includes, for the first object, a spin after the impact, and for the second object, a 3D impact vector at the impact.

In the present context, a radar is any element adapted to output electromagnetic radiation, such as radio waves, visible or invisible radiation, and from such radiation reflected from an element, determine parameters related to the elements position, velocity, spin, acceleration, movement or the like. Preferably, the radar operates on the basis of radio waves and may be a CW Doppler radar.

Also, an imaging device may be any type of element adapted to generate an image of e.g. a scene or object. This device may be a camera, such as a still image camera or a video camera. Preferably, the device is adapted to have a variable zoom or enlargement of elements in the image, and different parameters of the image/video generation preferably are selectable, such as shutter time and/or number of frames per second.

The controlling means are adapted to receive an image from the imaging device and adapt the image by providing in the image data relating to the radar data, the altering of the image, such as altering the image of elements imaged on the basis of the radar data.

In one embodiment, the controlling means is adapted to identify, from the radar data and/or the image, a position of impact of two of the objects and illustrate:

for a first of the objects at least one of: a trajectory, a 3D launch vector and spin after impact and for a second of the objects at least one of trajectory, direction/angle of movement and 3D impact vector at impact.

Preferably, the controlling means is adapted to provide information relating to an impact between a golf club and a golf ball, both present in the fields of view of the radar and imaging device, the golf ball being the first of the objects and the golf club being the second of the objects.

In one situation, the controlling means is adapted to determine and illustrate one or more of:

a face angle of the club at impact, a relation between the ground and an axis of a club head of the club at impact, and a point of impact of the club head.

In the present context, the face angle may be an angle of a, usually plane or at least reasonably plane, surface or face of the club used for launching the ball.

Also, the relation between the ground and the axis may be an angle between the ground at the position of launch (horizontal or not) and a lower surface or a mean axis of the club head.

The point of impact of the club head may be a position of a launching surface of the head or a position within a circumference of the club head in a plane perpendicular to a direction of movement of the club head at impact.

In general, the position, trajectory or plane may be illustrated in the image at the correct position, which may be obtained by a calibration between the radar and the imaging device.

In the situation of a golfer swinging a club and launching a golf ball, the tee position, the trajectory of the club head, the plan of the trajectory of the club head, the trajectory of the ball, a plane, a direction, angle or the like of the ball, the strike position, angles of impact of the club head and ball may be illustrated, as may any other interesting parameters.

In the situation with the golfer striking or being about to strike a golf ball, the distance from the golfer's shoes to the ball may be of interest as may the vertical and horizontal distance from the golfer's head to the ball. Such information may be derived from the image and illustrated in the image as lines, rulers, numbers or the like.

In one situation, the controlling means are adapted to adapt an image in relation to radar data obtained at least substantially simultaneously with the image. This has the advantage that the altering of the image is performed so that, e.g., real time parameters may be seen. If a golfer striking a golf ball is imaged in a video sequence, the path/trajectory of the club and/or ball may be determined on the basis of the radar data and visualized in the image/video.

Alternatively, the image and radar data may be stored, and the image(s) altered subsequently with radar data from a plurality of points in time or a time period. Normally, the point in time of providing the image is included in the points in time or time period of the providing of the radar data. Thus, an image or a video sequence may be adapted or altered by illustrating therein a trajectory, position, velocity, acceleration or any relation thereof of one or more moving elements imaged in the image/video. Thus, the full trajectory, for example, of a ball or club may be illustrated in all images of a video sequence of a swing or an image relating to a point in time in relation to the swing.

Preferably, the radar and imaging device are fixed in relation to each other. In this manner, a field of view of the radar may overlap with a field of view of the imaging device. Thus, elements viewed by the imaging device may be sensed by the radar, and the radar data may then be introduced in the image. Naturally, the fields of view need not be identical, but a certain overlap is preferred, as this overlap may be the primary working area/angle of the assembly.

In a preferred embodiment, the assembly further comprises means for deriving position data relating to a flying object imaged by the imaging device and positioned in a field of view of the radar. In this situation, the object will be in the above primary working area/angle of the assembly.

In this situation, deriving means may be adapted to derive the position data from both the radar data and the image. In general, data relating from radars may have a relatively low angular precision or certainty, whereas that of an imaging device may be rather high. Contrary to that, a distance between the imaging device and an imaged object, or a relative velocity may be difficult to determine when using standard cameras. Thus, angular measurements may be obtained from the imaging device, whereas distance/velocity data may be determined on the basis of the radar data. Combining such data, the position acceleration, velocity or the like of an object may be determined with a certainty higher than that obtained by the imaging device and the radar alone.

In one embodiment, the controlling means is adapted to determine one or more positional relationships between elements identifiable or identified in the image. Such relationships may be provided in the image as e.g. positions, distances, angles or the like. The identification of elements in images is an old and well known technology.

Another aspect of the invention relates to an assembly including a radar and an imaging device both adapted to provide information relating to one or more objects. The assembly further includes a controller adapted to receive radar data from the radar and an image from the imaging device and adapt the image in relation to the radar data. The assembly further includes a processing element adapted to receive an image from the imaging device, identify an element therein, and generate an altered image in which the element seems rotated.

In this respect, the imaging device and radar may be as those of the above aspect. Also all elements of the individual aspects of the invention may by interchanged, as the skilled person will understand.

The rotation is a well-known technique, and may be performed in a number of manners depending on the image (s) available as well as the computing power available. If only a single image is available, the rotation may be obtained using the so-called perspective transformation. If more than one image is available, such as when stereo imaging (the providing of two images from different angles and at the same point in time) is used, the rotation may be performed by generating an image by combining the two initial images. In this situation, the individual pixels or points in the resulting image are determined on the basis of the corresponding parts of the initial images. In this situation, different weights may be put on the individual initial parts of the initial images depending on the distance from the actual part of the scene imaged to the individual imaging device. The larger the distance, the lower the weight the part of the pertaining image is given.

If enough cameras are used, any angle may be selected, and it is possible to view e.g. a person from any angle desired. This is standard 3D vision technology.

In one situation, it is desired to rotate the scene in a manner so that a pre-determined angle, direction, axis or set-up is obtained. This may be achieved by the processing element being adapted to determine, from the radar data and/or the image, a predetermined direction or axis, and to provide the altered image wherein the direction or axis is rotated into a predetermined direction or axis. A suitable direction or axis will depend heavily on the imaged scene and the individual situation. Natural directions or axes may be present in some scenes, such as roads, railway tracks, horizontal or vertical lines or the like. In other situations two or more positions or elements may be identified (in the image or by the radar), and directions or axes be defined there from.

In a particular situation where a golfer is aiming to launch a golf ball from a tee position to a target position, which may be identified by a flag, the direction from the tee to the target may be selected as the direction. In this situation, the tee position may be determined from the image/video data at a point of time before launch, or from the radar data at or after launch (see WO 2006/002640) and the target position may be identified in the image either by pattern recognition or by a person indicating the target in the image (see e.g. WO 2006/002639).

Having determined the position/direction/axis, the rotation of the image may be performed.

It should be noted that in addition to the rotation, the image may also be scaled (such as cropped), in order to standardize the contents of the image. In addition, the image may be adapted to have a standard angular section and perspective.

This scaling or other adaptation may be in order to have a pre-determined element have a predetermined extent in the image, or a distance have a predetermined extent in the image.

This may be advantageous in a situation where the assembly further comprises means for storing the altered image and providing this at a later point in time for comparison with a second, altered or not, image. Thus, having altered the image into the desired set-up, this may now more easily be compared to other images rotated/scaled to the same set-up.

In the situation of the golfer, the images may be rotated/moved to all have an axis between tee and target in the same direction and being scaled so that all golfers have the same height. Then, the postures, angles (club handle to arm, upper/lower arm, legs, between directions of movement ball/club or the like) and relative positions (golf ball to shoe, head in relation to golf ball or the like) may be compared directly.

In a particularly interesting embodiment, the processing element is adapted to, in the altered image, provide data relating to the radar data, the relating data provided being rotated correspondingly.

In that situation, the radar data and other data may also be rotated and/or scaled in order to describe the rotated scene. Especially when this data is to physically illustrate lines, curves, distances, positions in relation to elements imaged in the image, this repositioning is desired.

Then, this added data may still describe the scene of the image in the same manner as before rotation.

Naturally, the assembly may further comprise means for storing the rotated data and provide this at a later point in time for comparison with second, rotated data.

Then, when comparing the rotated/scaled image to another image, this additional data may also be compared, whereby additional information is present and an in-depth comparison may be made.

Thus, pros or amateurs may compare their swing, performance, distances, looks, postures etc. with others, such as trainers, pros or champions--or themselves in order to monitor progress.

In a preferred embodiment, the assembly further comprises a second imaging device, the second imaging device being calibrated in relation to the imaging device and/or the radar.

In this respect, the calibration typically will be to the effect that the viewing direction or field of view of the second imaging device is known in relation to that/those of the other imaging device and/or radar. In this manner, e.g. stereo vision is possible, as is the correlation of elements imaged by the second imaging device and sensed by the radar.

Naturally, this calibration may be performed in a number of manners, such as using visible elements imaged by both imaging devices and/or visible by the second imaging device and sensed by the radar.

Naturally, this second imaging device may be fixed in relation to the other imaging device and/or the radar, which makes the calibration easy. Alternatively, it may be freely movable in relation thereto, which may require a re-calibration when the relative positions are changed.

In general, the controlling means may be adapted to receive an image from the second imaging device and adapt the image thereof in relation to the radar data. This adaptation may be as that of the other image, whereby, again, the positions/trajectories/planes/directions etc. may be introduced, as may other information relevant to the scene imaged. Preferably, the image from the second imaging device is adapted in accordance with the calibration, so that if this image is provided from another position/angle/distance, the image is adapted in accordance therewith. Thus, e.g., a direction or axis is introduced correctly in relation to the different viewing angle of the second imaging device.

In general, the radar data or video images may additionally be used for estimating a velocity of an imaged or sensed element and to adapt a replay speed (frames per second) on the basis of this velocity. From a series of frames, a velocity of an element moving during filming may be estimated by the displacement of the element between frames. Using a radar, such movement may be estimated virtually in real time.

Replaying the video, the frame rate may be reduced, when the velocity of the imaged/sensed element exceeds a threshold, such as to better illustrate the movement. Alternatively, the frame rate may constantly be adapted to the velocity in any desired manner.

An aspect of the invention relates to a system including a radar and an imaging device both adapted to provide information relating to one or more objects. The assembly further includes a controller adapted to receive radar data from the radar and an image from the imaging device and adapt the image in relation to the radar data. The system further includes one or more radar reflecting elements positioned in predetermined positions in relation to the assembly. The radar is adapted to provide information relating to a relative position, distance/direction and/or angle/rotation between the reflecting element(s) and the assembly, and the controller is adapted to adapt an image received from the imaging device in accordance with the relative position/angle/rotation/direction/distance. Again, the radar and imaging device may be as those of the above aspects, as may the calibrations etc.

In this respect, a radar reflecting element may be any element detectable by the radar. A number of radars can only detect moving objects, whereby the reflecting element may comprise a moving part, such as a fan or the like, which is detectable by the radar. An alternative is the simulation of a moving object by providing a reflecting element having a transponder outputting a signal emulating a moving object.

In general, and also for radars able to detect immovable objects, it may be desired to ensure sufficient reflection of the radiation. This is a standard concern.

In the present aspect, the reflecting elements are positioned in predetermined, normally fixed or stationary, positions in relation to the assembly. Preferably, such positions are within the field of view of the radar, or the assembly may be brought to a position where the element(s) is/are within this field of view. Naturally, a number of such elements may be used, of which not all are in the field of view at the same time.

The radar is adapted to provide information relating to a relative position/distance and/or angle/rotation between the reflecting element(s) and the assembly. Then, the controlling means are adapted to adapt an image received from the imaging device in accordance with the relative position/angle/distance/rotation.

If the controlling means has access to information relating to the distance, positions or relative distances or positions of the elements, the controlling means may be adapted to determine a position of the assembly in relation to the elements and thereby the surroundings. In this manner, the initial positioning of the assembly may require less stringency, as the assembly is adapted to itself determine its position/rotation/distance. Then, this information may be used for adapting the image.

This adaptation of the image may simply be the introduction of information relating to the rotation/position/distance of the assembly in relation to the surroundings, such as the introduction of the corners of the world, pointers toward interesting places or objects, distances to certain elements or the like.

An especially interesting embodiment is one further comprising means for receiving information relating to a position or area in the surroundings of the assembly, the controlling means being adapted to provide, in the image, information relating to the position or area. This information may be derived by the assembly or may be received from another element/sensor or the like. Thus, this knowledge may be used for overlaying the image with information relating to objects or demarcations in the surroundings, such as the lines of a soccer field, a hole position of a golf course or the like. In addition, equidistant lines, squares or elements may be provided in order to determine relative distances between elements in the surroundings. Naturally, such elements may be determined or identified from the radar data and/or the image.

An interesting situation is where the position is not a particular element in the image but simply a position, such as an estimated landing zone or point of a flying object, such as a golf ball or a baseball. In this situation, this position may be illustrated in the image, and in fact the precision of the estimation may be illustrated as a circle surrounding (such as rotated to the ground plane of the surroundings) the estimated landing spot. As the landing spot estimation becomes more precise, this circle may be reduced in size.

In one situation, the assembly is rotatable/movable in relation to the surroundings, and the controlling means is adapted to estimate a rotation/movement or rotational position from relative position(s) of the reflecting element(s). Thus, even if the assembly moves, this movement may be determined from the resulting displacements of the positions of the reflecting elements in relation to the radar.

In that situation, the controlling means may be adapted to highlight the position or a part of the area which lies in the image, such as when this is in the field of view. When the assembly rotates, this is determined by the radar, and as the image as a result of the rotation changes, a re-determination of the position/area is made so as to keep indicating the correct position/area in relation to the imaged scene. Naturally, if the image is zoomed, this may be taken into account.

In this manner, the imaging device of the assembly may be used for tracking a golf ball in flight, while tracking, using the radar, the actual direction of the assembly and while receiving information relating to the landing zone. When the landing zone (or part thereof) enters the field of vision of the imaging device and therefore is seen in the image, the landing zone information may be provided, as may a highlighting of the hole, if desired.

Alternatively, the assembly may overview or pan the landing zone area and "await" the touchdown of the ball which a part of the time is not imaged and not sensed by the radar, while the illustration of the estimated landing point is illustrated.

Also, during flight, a pointer toward e.g. the hole, a distance, a height of the ball, a velocity or any other interesting information may be provided in the altered image.

Another aspect of the invention relates to a method of operating an assembly including a radar and an imaging device. The method includes providing information relating to a plurality of objects, the radar outputting radar data, and the imaging device outputting an image. The method further includes determining, from the radar data, movement and/or position data, of objects imaged by the imaging device and positioned in a field of view of the radar. The data describes positions, directions, trajectories or planes of movement of the objects. The method further includes providing movement data to the data at a correct position in the image. The movement data illustrates the positions/trajectories/planes/directions of the objects in the image. The determining step includes identifying, from the radar data and/or the image, a position of impact of a first object of the objects and a second object of the objects. The providing step includes illustrating, for the first object, a spin after the impact and, for the second object, a 3D impact vector at the impact.

In this respect, the radar and imaging device may be as those described above.

Again, the adaptation may be that of introducing relevant information in the image, the relevant information being derived e.g. from the radar data.

In one situation, the determining step comprises identifying, from the radar data and/or the image, a position of impact of two of the objects, the providing step comprising illustrating:
  for a first of the objects at least one of: a trajectory, a 3D launch vector and spin after impact and
  for a second of the objects at least one of trajectory, direction/angle of movement and 3D impact vector at impact.

Then, the determining step could comprise providing information relating to an impact between a golf club and a golf ball, the golf ball being the first of the objects and the golf club being the second of the objects.

As described above, different positions, such as that of a tee, a head, a foot or the like, may be illustrated, as may trajectories of moving objects, distances between elements, angles of elements, planes, strike positions or the like. Thus images or video may be provided with this added information describing the movements imaged.

The determining step preferably comprises determining one or more of, and the providing step comprises illustrating one or more of:
  a face angle of the club at impact,
  a relation between the ground and an axis of a club head of the club at impact, and
  a point of impact of the club head.

In one situation, the radar data are obtained at least substantially simultaneously with the image. In other situations, image data may be adapted using radar data from a plurality of points in time or a period of time. As mentioned above, the point in time of taking an image preferably is included in the points in time or time period of providing the radar data.

Preferably, the method has the initial step of fixing the radar and imaging device in relation to each other, preferably so that a field of view of the radar overlaps with a field of view of the imaging device. In this manner, a calibration of the fields of views etc. need be performed only once.

In one embodiment, the method further comprises the step of deriving position data relating to a flying object imaged by the imaging device and positioned in a field of view of the radar, the deriving step comprising deriving the position data from both the radar data and the image. Thus, angle data may be used from the image and distance/velocity data may be used from the radar.

Preferably, the adapting step comprises providing, in the image, data relating to the radar data. Normally, this data would relate to an element imaged in the image, but this is not a requirement.

In a particular embodiment, the method further comprises the step of determining one or more positional relationships between elements identifiable or identified in the image. In the above golfer situation, the distance between the ball and the feet or vertically or horizontally to the head may be interesting.

In this situation, the positions may be derived from the radar and/or the image.

Such positions and positional relationships (distances, angles, projections or the like) may be provided in the adapted image.

In another aspect, the invention relates to a method of operating an assembly including a radar and an imaging device. The method includes providing information relating to one or more objects, the radar outputting radar data, and the imaging device outputting an image. The method further includes adapting the image in relation to the radar data, and determining, from the radar data and/or the image, a predetermined direction or axis. The step of providing the altered image includes providing an altered image wherein the direction or axis is rotated into a predetermined direction or axis.

As mentioned above, a number of techniques exist, depending on the availability of processing power, the number of imaging devices etc.

Preferably, the method further comprises determining, from the radar data and/or the image, a predetermined direction or axis, and wherein the step of providing the altered image comprises providing an altered image wherein the direction or axis is rotated into a predetermined direction or axis. As mentioned above, this may be followed or preceded with a scaling of the image. The direction/axis or positions used for generating or identifying these may be derived both from the radar data and/or the image.

In this situation, preferably the method further comprises storing the altered image and providing this at a later point in time for comparison with a second, altered or not, image. Having provided the desired rotation and possible scaling, comparison is facilitated.

Naturally, it may be desired that the step of providing the altered image comprises providing, in the altered image, data relating to the radar data, the relating data provided being rotated correspondingly, so that this additional data is maintained or also provided. Thus, this data is, if required, rotated/scaled in the same manner.

In this situation, it is preferred that the method further comprises the step of storing the rotated data and providing this at a later point in time for comparison with second, rotated data. In this manner, not only the images but also the radar data may be compared.

In a preferred embodiment, the method further comprises the step of a second imaging device generating a second image, the second imaging device preferably being calibrated in relation to the imaging device and/or the radar. This calibration may be performed by imaging visible elements also imaged by the other imaging device and deriving a correspondence between the positions in the two images of the element. Alternatively or in addition, an element may be imaged by the second imaging device and sensed by the radar in order to provide a correspondence between positions in the image and in relation to the radar.

Also the calibration may be a timing relationship ensuring that the timing relationship between the second imaging device and the radar and/or the other imaging device is known.

One embodiment further comprises the step of the second imaging device generating an image and the step of adapting the image in relation to the radar data. This adaptation may be as that mentioned above. If the second imaging device is positioned in another position than the other imaging device, the adaptation preferably is different, taking into account the different viewing angles of the images.

As mentioned above, the radar data and/or video images may also be used for estimating a velocity of an imaged and maybe sensed element, this velocity may be used for controlling the frame rate when replaying the video.

An aspect of the invention relates to a method of operating an assembly including a radar and an imaging device both adapted to provide information relating to one or more objects. The assembly includes a controller adapted to receive radar data from the radar and an image from the imaging device and adapt the image in relation to the radar data in an environment comprising one or more radar reflecting elements positioned in predetermined positions in relation to the assembly. The method includes providing information, via the radar, relating to a relative direction/distance, position and/or angle/rotation between the reflecting element(s) and the assembly, and adapting an image received from the imaging device in accordance with the relative direction/distance/position/angle/rotation.

In this respect, when the reflecting elements are stationary in the surroundings, the direction of the assembly, as determined from the relative positions of the assembly and the reflecting elements, may be introduced in the image.

If the assembly is immovable, the relative positions need be determined only once by the angles between the radar (and thus assembly) and the reflecting elements. If the assembly moves, these relative positions will move.

Naturally, the adaptation of the image may be any adaptation relating to the relative positioning or movement.

One situation further comprises the step of receiving information relating to a position or area in the surroundings of the assembly and providing, in the image, information relating to the position or area. This information may be provided on the basis of the radar/imaging device or may be received from another element or sensor. This position or area need not be present in the image, but if so, it may be identified as described above.

A preferred embodiment is one further comprising the step of rotating the assembly in relation to the surroundings, and estimating a rotation or rotational position from relative position(s) of the reflecting element(s). In this situation, information relating to the rotation/movement may be introduced in the image.

Alternatively or additionally, the adapting step could comprise highlighting the position or area in the image. As described above, this position may enter or exit the field of view, and if the assembly moves, the position in the image of identifying this position/area will change, in order for it to be identified correctly in relation to the surroundings.

Even though the above description has been exemplified with a golfer example, the same functionality may be obtained in any other situation in which imaging and motion detection/determination is desired, such as in other sports (baseball, tennis, table tennis, cricket, soccer, football, handball, volley ball, basketball, or the like), as well as in other situations where a movement is desired imaged and quantified/illustrated at the same time.

As mentioned above, the individual aspects may be combined so that the assemblies of the first and second aspects may be one and the same, and the assembly used in the third of final aspects may be those of the first and second aspects, for example.

BRIEF DESCRIPTION OF THE DRAWINGS

In the following, the invention will be described with reference to the drawing wherein.

DETAILED DESCRIPTION OF EMBODIMENTS

Figure 1:
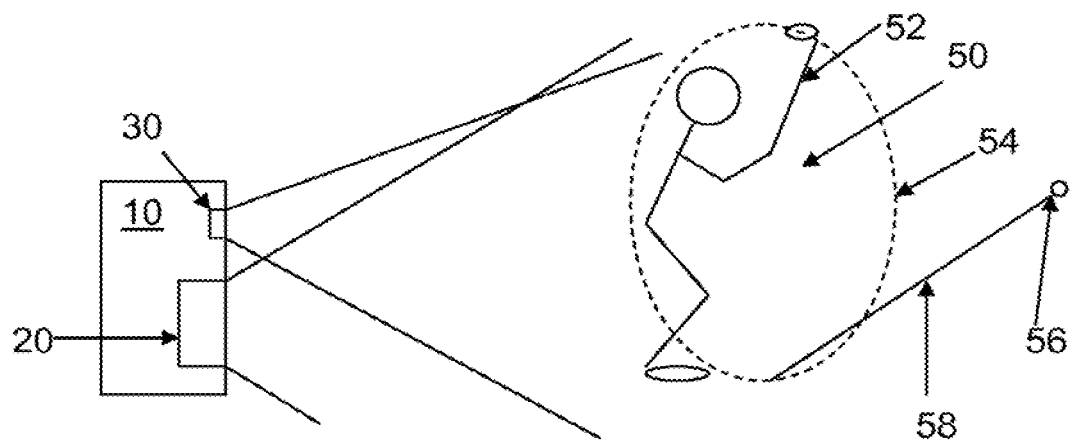
FIG. 1 illustrates an assembly according to the invention imaging a golfer.

In FIG. 1, an assembly 10 is illustrated having a radar 20 and a camera 30 both mounted within a housing 12. The radar 20 and camera 30 are calibrated to each other so that position data obtained from a moving object and using the radar 20 may be converted into a position in an image or video provided by the camera 30. This calibration may be provided using one or more elements being visible, so that the camera 30 may image it, while being adapted to reflect radar radiation so that its position may be determined by the radar 20.

The radar 20 and camera 30 are provided so as to have at least partly overlapping fields of view, so that movements of one or more objects in these fields of views may be both imaged and determined/quantified by the radar.

In FIG. 1, the golfer 50 swings a club 52, so as to swing it along a club trajectory 54, and hits a ball 56 which subsequently flies along a ball trajectory 58.

The movements of the club 52 and ball 56 are determined by the radar 20 while the camera 30 images the movements in one or more images, such as a video sequence with a predetermined number of frames per second.

From the data from the radar 20, it is possible to determine positions, velocities, angles and the like from the different moving elements (club 52 and ball 56) at different points in time, and this data may be correlated with images provided by the camera 30 at the same points in time. In this manner, both image data and movement/position/velocity/acceleration data may be provided.

Figure 2:
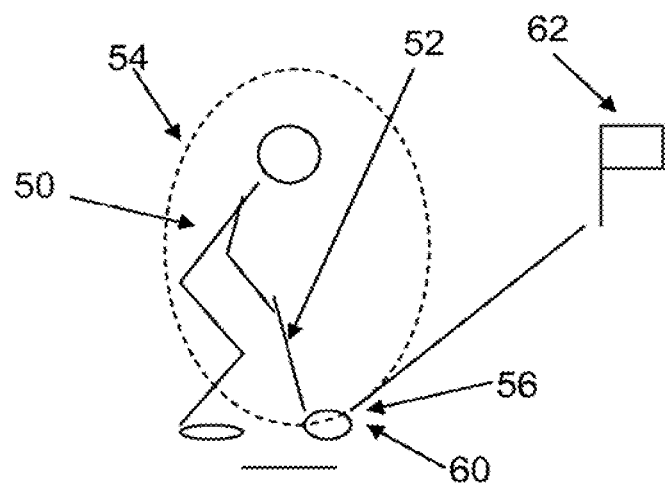
FIG. 2 illustrates an image or video provided of the golfer with radar data provided.

In addition, from the image(s), see FIG. 2, additional data may be provided, such as distances or relative positions of elements in an image. Interesting parameters for a golfer 50 is a distance between the golfer 50 and the ball 56 before striking the ball 56, such as from the golfer's shoes to the ball 56. Another interesting relative position is the position of the golfers head in relation to the ball 56, along the horizontal plane.

In order to determine such data, it is desired to know the distance from the camera 30 to the golfer 50 or ball 56. This distance may be determined in a number of manners, such as from the apparent size of the ball 56. As all golf balls have a standard size, other dimensions of the image may be derived.

Another manner is to determine the distance from ball 56 to radar 20 from the tee position 60 as determined subsequent to launching the ball 56. This is described in WO 2006/002640.

From the radar data, the trajectory of the club 52 head may be determined and may be provided in an image of the golfer 50 taken during swinging of the club 52. In addition, the trajectory of the ball 56, such as a 3D ball launch vector and ball spin, may be provided in the image data, and the direction/angle 64 of movement of the club 52 head, such as 3D club impact vector 66, at impact may be compared to the direction of the ball trajectory 58 after impact (see FIG. 3). From these directions, a face angle of the club 52, i.e. the angle of the club surface actually impacting the ball, may be determined, which is of interest to the golfer 50.

Actually, the trajectories of the club and ball may alternatively or additionally be determined from the video, if desired.

Another interesting parameter is the so-called lie angle which relates to the relation between the ground and the axis of the club head (whether the club has the heel or the toe closest to the ground). This may be determined from the video or image.

Actually, it may be desired to provide a grid or the like at the ground or from the ground up at the golfer in order for the golfer to know and compare (see below) the relative positions of the feet, tee 60, head and the like.

Figure 3:
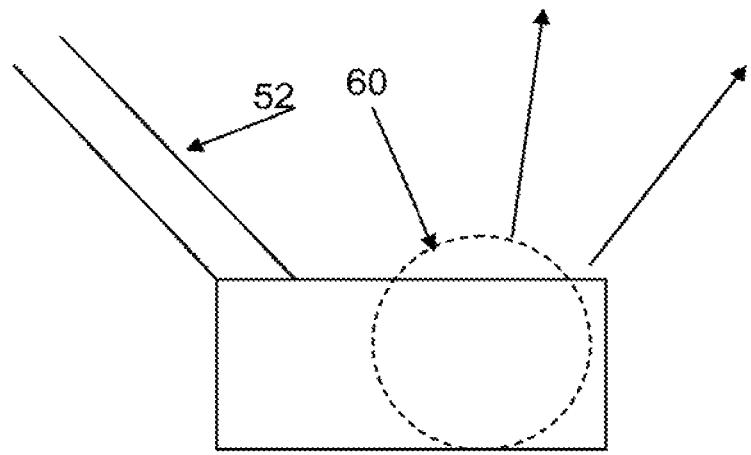
FIG. 3 illustrates a close-up image or video of a club at the time of impact.

Also, the camera 30 may be programmed or set to provide a close-up image or video of the ball 56 and club 52 at launch (see FIG. 3). A close-up video may be taken with an increased number of frames per second in order to gain a better insight of the parameters at launch. In addition the video or images may be provided with the determined trajectories 54/58 and/or directions etc. in order to illustrate the relative movements at or around launch.

From such images, the actual point of impact of the club head may be determined which is also of interest to the golfer.

In FIG. 3, a club 52 about to strike a ball 56 is illustrated along with data relating to the club trajectory 54 and the ball trajectory 58. From this data, the impact location of the ball on the club face can be determined. This is done by determining the location of the ball in the image and then subsequently comparing the location of the club head in an image taken at point of impact. If an image is not available at exactly the time of impact, the club trajectory data determined by the radar can be used for determining where the club head will be moving from the location in the image just prior to impact or prior to an image just after impact.

It is noted, as described above, that a velocity, for example of the ball, determined using the images or the radar, may be subsequently controlling the frame rate when replaying the video. Thus, the frame rate may be reduced when the velocity increases in order to better illustrate the video in spite of the increased velocity.

Reverting to FIG. 2, and as is mentioned in WO 2006/002639, a golfer may, in the image, identify a target 62, which is aimed at. Then, as the tee or point of launch 60 and the target 62 are identified, a coordinate system may be set up with origo in the tee 60 and an axis along the direction from the tee 60 to the target 62. This is the main coordinate system of the golfer 50.

However, the positioning of the assembly 10 in relation to the golfers coordinate system will depend on a number of parameters, whereby it is far from certain that image data obtained at different points in time (whereby the assembly may be positioned at different relative positions, distances, angles) may easily be compared. In order to provide comparable data, the coordinate system is determined in the originally obtained image/video/radar data, where after the image(s) is/are rotated, using simple image manipulation such as perspective transformation, so as to have the axis from tee 60 to target 62 be along a predetermined direction in the altered image. In addition, a scaling (enlargement/reduction) or translation of the image may be desired in order to have the distance from the tee 60 to the assembly 10 be as desired, or other image manipulation such as to obtain a desired angular section or perspective.

This rotation may also be performed of the radar data, so that the same trajectories/positions or the like may be illustrated correctly also in the rotated/scaled image. This is a simple operation, as the rotation/scaling is known.

After this altering of the image(s), comparison is possible. Then, the same golfer 50 may, independently of the relative position of the assembly, store a number of swings for later comparison, or he/she may compare a swing to that of another golfer, such as a trainer, a pro or the like. Also, the trajectories, planes, angles and the like may be compared rather easily.

Naturally, if more than one camera 30 is provided, the rotated image may be generated on the basis of multiple images (preferably provided or taken at least substantially the same point in time), in any of a number of manners.

In one situation, the generation of the image from multiple images may be performed by identifying, for each part or pixel in the final image, corresponding parts of the initial images and weighting the information in the two initial images on the basis of the distance from the pertaining imaging device to the object. In this manner, the imaging device with the smallest distance will be given the largest weight for that part of the final image.

If a second camera 32 is provided, this should be calibrated to the first camera 30 and/or the radar 20 so that a correlation of elements in the image of the second camera 32 with elements imaged by the first camera 30 and/or as detected by the radar 20 is possible.

This calibration may also be a correspondence between generation of images with the image generation of the first camera 30 and/or the obtaining of data by the radar 20. A number of manners of obtaining this are known such as the forwarding of instructions to the second camera 32 as to when to generate an image, the providing with the images from the second camera 32 of timing information describing a point in time of deriving the image, or the like, so that images or image and radar information corresponding in time (such as derived within a predetermined maximum time period) are selected and used.

In this manner, it may be possible to actually provide, in the image/video of the second camera 32, data relating to the radar data in the same manner as described above for the image/video of the first camera 30.

Naturally, the information derived may be presented in a number of manners, such as an image having therein trajectory data (ball and/or club), target/tee positions and wherein images of the golfer at different points in time during the swing may be overlapped.

Figure 4:
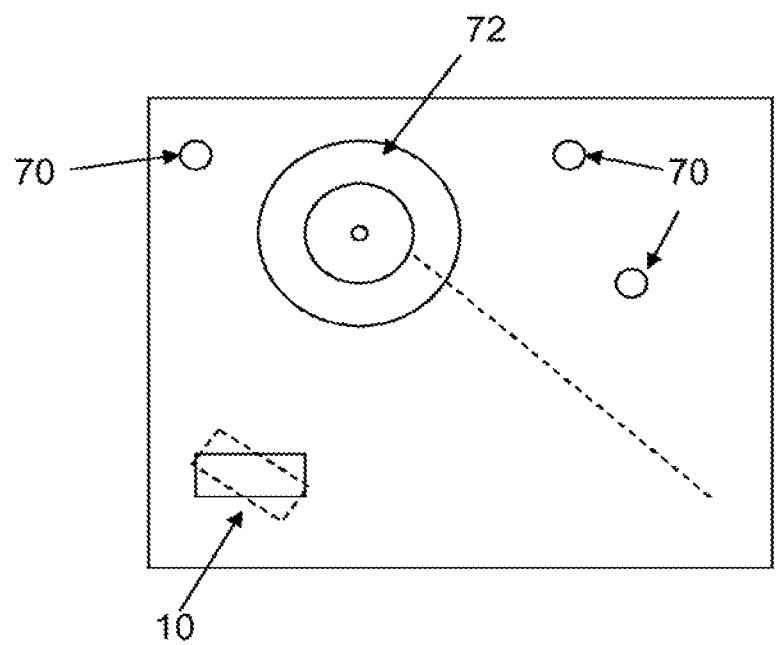
FIG. 4 illustrates a rotatable assembly.

FIG. 4 illustrates another manner of using the assembly 10, which is in connection with one or more radar reflecting elements 70 positioned in the surroundings of the assembly 10 and within (at least at times) the field of view of the radar 20.

A radar reflecting element 70 may be an element reflecting the radio waves either by providing a moving element (such as a fan or flag) or by receiving the wave and outputting a corresponding wave (so-called transponder).

When the assembly 10 is rotatable and rotating, the position of a reflecting element 70 will move within the field of view of the radar 20, which will then determine this movement or position. Knowing the relative positions of the elements 70 will, even during movement/rotation of the assembly 10, make the assembly 10 able to determine its position and/or rotation/rotational position, in relation to the surroundings from the positions determined by the radar 20.

In this situation, the images provided by the camera 30 of the assembly may be adapted to this movement/rotation/position/rotational position.

In one situation, an element in the surroundings has a known position in relation to the assembly 10 or the element(s) 70 even if not imaged by the camera 30 and/or determined/detected by the radar 20. This position may be known from measurements of another assembly 10 or those illustrated in the above-mentioned WO-references.

Nevertheless, it may be known or estimated that this element will enter the field of view of the camera 30, whereby the image of the camera 30 may be altered to reflect this. One manner of reflecting this may be to illustrate where or when in the image the element will enter.

However, it is clear that when the assembly 10 moves, the point of entry of the element into the image of the camera 30 will change, but due to the constant monitoring of the movement/rotation/etc. of the assembly 10 by the radar 20 and potentially a constant or intermittent updating of the position/uncertainty, this change may be determined and the image thereafter be made to reflect the new position upon movement of the assembly.

In a particularly interesting situation, the camera 30 may image an expected or calculated/estimated touch down spot or landing spot of a struck golf ball or baseball. This landing spot may be determined in any desired manner such as from a radar as that described in WO 2005/116678.

From e.g. a determined trajectory of the flying golf ball or baseball, the actual position and landing spot may be constantly determined in order to provide an estimate of the landing spot with greater and greater accuracy.

In the image of the assembly 10 imaging the estimated landing spot, the estimated landing zone may be illustrated by a circle having a diameter reflecting the uncertainty of the landing spot determination. As the ball approaches the landing spot, the certainty will increase and the circle illustrated in the image of the camera 30 may be made correspondingly smaller. Also, the landing spot or center of the circle may move.

Naturally, other types of data may be illustrated, such as an estimated trajectory of the ball, an expected rolling of the ball or the like.

This illustrating, due to the operation of the radar 20 and the elements 70, is no longer dependent on the camera 30 and the assembly 10 being fixed in relation to the surroundings. If the assembly 10 rotates, for example, the rotation will be detected by the radar 20, as the position(s) of the element(s) 70 will change. From this change, the rotation may be quantified, and the landing spot or other position of the surroundings may be correspondingly altered.

Then, the camera 30 may be rotated to follow the path of the ball 56 in flight while illustrating, when the estimated landing spot enters the field of view of the camera 30, the landing spot estimate or other desired data.

Naturally, a zooming in or out of the camera 30 will alter the relative positions of the element(s) 70 in the image. As the zooming is known, however, this is easily determined so that zooming in may be performed with the corresponding amendment of the added data, such as landing spot position and uncertainty.

Even though the figures and pertaining description have focused on the use of the present assembly for use in golf, the same functionality may be obtained in any other situation in which imaging and motion detection/determination is desired, such as in other sports (baseball, tennis, table tennis, cricket, soccer, football, handball, volley ball, basketball, or the like), as well as in other situations where a movement is desired imaged and quantified/illustrated at the same time.

What is claimed is:

1. A system for coordinating radar data and image data to track a flight of a projectile, comprising:

a radar;

an imager providing a plurality of images of an area into which a projectile is to be launched; and a controller receiving the images and an identification of a target within a first one of the images, the controller identifying a target line connecting the target and a launch position of the projectile, the controller also receiving data from the radar relative to at least a portion of a trajectory of the projectile, the controller generating image based trajectory data by correlating the radar data and a second one of the images, the controller altering the second image to include the image based trajectory data within the second image and the target line within the second image, wherein the controller is configured to position the target line in the second image based on an orientation and position of a radar coordinate system and an imager coordinate system.

2. The system according to claim 1, wherein the controller determines a deviation between the portion of the trajectory and the target line.

3. The system according to claim 1, wherein the target is identified by input received by the controller from a user.

4. The system according to claim 3, wherein the user input is generated by interaction with the first image.

5. The system according to claim 1, wherein the controller receives data corresponding to a distance from the imager to the target and determines based on the distance from the imager to the target and the data from the radar a deviation of the projectile between a direction of flight of the projectile and the target line.

6. The system according to claim 1, wherein the launch position of the projectile is within a field of view of the imager and a field of view of the radar, the controller determining the launch position based on the data from the radar.

7. The system according to claim 1, wherein the controller alters the second image while the projectile is in flight.

8. The system according to claim 1, wherein the controller determines a position of the portion of the trajectory within the second image and alters the second image to include a visual representation of the portion of the trajectory within the second image.

9. The system according to claim 8, wherein the controller alters the second image to include a visual representation of the target line.

10. A device for coordinating radar data and image data to track the flight of a projectile comprising a controller receiving a plurality of images and an identification of a target within a first one of the images, the controller identifying a target line connecting the target and a launch position of the projectile, the controller also receiving data from a radar relative to at least a portion of a trajectory of the projectile, the controller generating image based trajectory data by correlating the radar data and the images, the controller altering a second one of the images to include the image based trajectory data within the second image and the target line within the second image.

11. The device according to claim 10, wherein the controller comprises a computing device receiving data from a radar positioned so that the portion of the trajectory is within a field of view of the radar and wherein the computing device receives the images from an imager having a field of view including the target and the portion of the trajectory.

12. The device according to claim 11, wherein controller receives input identifying the target and identifies the target as an intersection of vertical and horizontal reference lines.

13. The device according to claim 10, wherein the controller determines a position of the portion of the trajectory within the second image and alters the second image to include a visual representation of the portion of the trajectory within the second image.

14. A method for coordinating radar data and image data to track a flight of a projectile, comprising the steps of:

receiving by a controller a plurality of images and an identification of a target within a first one of the images as well as radar data relating to at least a portion of a trajectory of a projectile traveling through a field of view represented by the first image;

identifying by the controller a target line connecting the target and a launch position of the projectile;

generating by the controller image based trajectory data by correlating the radar data and the images;

altering a second one of the images to include the image based trajectory data and the target line within the second image; and manipulating, by the controller, the second image to position the target line in the altered second image based on an orientation and position of a radar coordinate system and an imager coordinate system.

15. The method according to claim 14, further comprising the step of determining a distance from the launch position to the target.

16. The method according to claim 14, wherein the controller correlates the radar data and the image based on data corresponding to a position of the imager relative to the radar.

17. The method according to claim 15, wherein the distance from the launch position to the target is input by a user.

18. The method according to claim 14, wherein the distance from the launch position to the target is determined by the controller based on a comparison of an angular extent of the target within one of the images and a known size of the target.

19. A method for coordinating radar data and image data to track a flight of a projectile, comprising the steps of:

receiving by a controller an image and an identification of a target within the image as well as radar data relating to at least a portion of a trajectory of a projectile traveling through a field of view represented by the image;

identifying by the controller a target line connecting the target and a launch position of the projectile;

generating by the controller image based trajectory data by correlating the radar data and the image; and altering the image to include the image based trajectory data and the target line within the image, wherein the controller identifies a radar coordinate system corresponding to the data received from the radar and an image coordinate system corresponding to the image and correlates the data from the radar with the image by coordinate translating the data from the radar to the image coordinate system through a three dimensional translation and rotation.

20. A system for coordinating radar data and image data to track a flight of a projectile, comprising:

an imager producing a plurality of images of a desired field of view;

a radar tracking objects moving through at least a portion of the desired field of view;

a controller receiving the images and an identification of a target within a first one of the images; the controller receiving data from the radar relating to at least a portion of a trajectory of a projectile traveling through the desired field of view, the controller identifying a target line connecting the target and a launch position of the projectile and generating image based trajectory data by correlating the radar data and at least a first one of the images, the controller altering a second one of the images to include the image based trajectory data and the target line, wherein the controller identifies a radar coordinate system corresponding to the data received from the radar and an image coordinate system corresponding to the images and correlates the data from the radar with the image by coordinate translating the data from the radar to the image coordinate system through a three dimensional translation and rotation.

21. The method according to claim 14, wherein the controller determines a position of the portion of the trajectory within the image and alters the image to include a visual representation of the portion of the trajectory within the image.

22. The method according to claim 19, wherein the controller determines a deviation between the portion of the trajectory and the target line.

\* \* \* \* \*